United States Patent
Finn

(10) Patent No.: US 10,687,374 B1
(45) Date of Patent: Jun. 16, 2020

(54) PEER-TO-PEER ATTRIBUTION IN INTERNET OF THINGS ENVIRONMENT

(71) Applicant: International Business Machines Corporation, Armonk, NY (US)

(72) Inventor: Peter George Finn, Markham (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/237,896

(22) Filed: Jan. 2, 2019

(51) Int. Cl.
*G06Q 20/38* (2012.01)
*H04W 84/18* (2009.01)
*H04W 76/11* (2018.01)
*H04W 4/70* (2018.01)
*H04W 4/80* (2018.01)
*H04W 64/00* (2009.01)

(52) U.S. Cl.
CPC ......... *H04W 76/11* (2018.02); *G06Q 20/382* (2013.01); *H04W 4/70* (2018.02); *H04W 4/80* (2018.02); *H04W 64/003* (2013.01); *H04W 84/18* (2013.01)

(58) Field of Classification Search
CPC ..... H04W 76/11; H04W 64/003; H04W 4/80; H04W 4/70; H04W 84/18; G06Q 20/382
See application file for complete search history.

(56) References Cited

U.S. PATENT DOCUMENTS

| | | | |
|---|---|---|---|
| 9,049,545 B2 * | 6/2015 | Duggal | H04M 3/42357 |
| 9,595,059 B2 | 3/2017 | Knudson et al. | |
| 2009/0319388 A1 | 12/2009 | Yuan et al. | |
| 2015/0112838 A1 * | 4/2015 | Li | H04W 4/21 |
| | | | 705/26.61 |
| 2015/0254751 A1 | 9/2015 | Torres | |
| 2019/0028861 A1 * | 1/2019 | Lewis | G06K 7/10475 |
| 2019/0043328 A1 * | 2/2019 | Thomas | G08B 13/2402 |

OTHER PUBLICATIONS

Perez, S., "Pounce, The App That Helps Shoppers Find Items Using Image Recognition is Now a Deals Browser, Too", printed Nov. 16, 2018, 9 pages.
Sedghi, A., "New app Asap54 is 'Shazam of shopping'", Technology, The Guardian, Mar. 4, 2014, 4 pages.

(Continued)

*Primary Examiner* — Mohamed A Kamara
(74) *Attorney, Agent, or Firm* — Stosch Sabo

(57) ABSTRACT

Techniques for peer-to-peer attribution including receiving, at a server and from a first user profile of a P2P application executing on a first user device, an image of an item, a plurality of radio-frequency identifiers, and a plurality of other user profiles respectively executing on a plurality of other user devices communicatively coupled to the first user device by a wireless personal area network (WPAN). The techniques further include performing object recognition on the image, retrieving a first product, transmitting inventory information for the first product from a third-party server to the first user device, receiving an order confirmation for the first product, executing a smart contract between the first user profile, a second user profile, and the third-party, and adding the first product to a first inventory of the first user profile.

20 Claims, 9 Drawing Sheets

(56) References Cited

OTHER PUBLICATIONS

Chaykowski, K., "Pinterest Will Let You Snap Photos to Find Real-Life Products Online", Forbes, #AllThingsMobile, Jun. 28, 2016, 3 pages.
Ryan, L., "How the Retail Industry Can Benefit From the Internet of Things", Mokriya Blog, 2017, 13 pages.
Townsend et al., "America's 'Retail Apocalypse' Is Really Just Beginning", Bloomberg, Nov. 8, 2017, 19 pages https://bloom.bg/2hedCqw.
Corben, R., "Economic Report Predicts Rise in Global Counterfeiting, Piracy", East Asia, Mar. 27, 2017, 3 pages http://bit.ly/2kqM4CA.
Unknown, "Global Retail Industry Worth USD 28 Trillion by 2019—Analysis, Technologies & Forecasts Report 2016-2019—Research and Markets", Business Wire, Jun. 30, 2016, 2 pages http://bit.ly/2u0vMVb.
Unknown, "Retail e-commerce sales worldwide from 2014 to 2021 (in billion U.S. dollars)", Statista, printed Nov. 16, 2018, 3 pages http://bit.ly/2eWZ8Zx.
Mell et al., "The NIST Definition of Cloud Computing", Recommendations of the National Institute of Standards and Technology, Sep. 2011, 7 pages.

\* cited by examiner

US 10,687,374 B1

PEER-TO-PEER ATTRIBUTION IN INTERNET OF THINGS ENVIRONMENT

BACKGROUND

The present disclosure relates to peer-to-peer (P2P) processing, and, more specifically, to providing P2P attribution in an Internet of Things (IoT) environment.

Numerous factors are changing the marketing and purchasing landscape. A first factor is internet commerce. Internet retailers may offer similar items as physical stores for a discount relative to the prices at the physical store. Thus, customers have an incentive to shop at online retailers relative to physical stores. In some situations, regardless of price, internet purchases may offer other benefits such as variety and convenience.

Disadvantageously, internet retailers are unable to provide physical interaction with online products. Internet retailers traditionally provide photographs, videos, product specifications, and/or other information regarding products. However, customers may nonetheless benefit from seeing, touching, and/or otherwise interacting with a physical product to make a purchasing decision.

SUMMARY

Aspects of the present disclosure are directed toward a computer-implemented method comprising receiving, at a server and from a first user profile of a peer-to-peer (P2P) application executing on a first user device, an image of an item, a plurality of radio-frequency identifiers, and a plurality of other user profiles respectively executing on a plurality of other user devices communicatively coupled to the first user device by a wireless personal area network (WPAN). The method can further include performing object recognition on the image of the item by the server to generate a classified item. The method can further include retrieving, by the server and from a database, a first product corresponding to one of the plurality of radio-frequency identifiers and that is included in an inventory of a second user profile from the plurality of other user profiles. The method can further include matching, by the server, the first product to the classified item based on the first product having a classification corresponding to the classified item. The method can further include transmitting, by the server, inventory information for the first product from a third-party server to the first user device. The method can further include receiving, at the server and from the first user device, an order confirmation for the first product. The method can further include executing a smart contract between the first user profile, the second user profile, and the third-party, wherein executing the smart contract causes the third-party to ship the first product to a first address of the first user profile. The method can further include adding, by the server, the first product to a first inventory of owned items of the first user profile.

Further aspects of the present disclosure are directed toward a system and computer program product with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
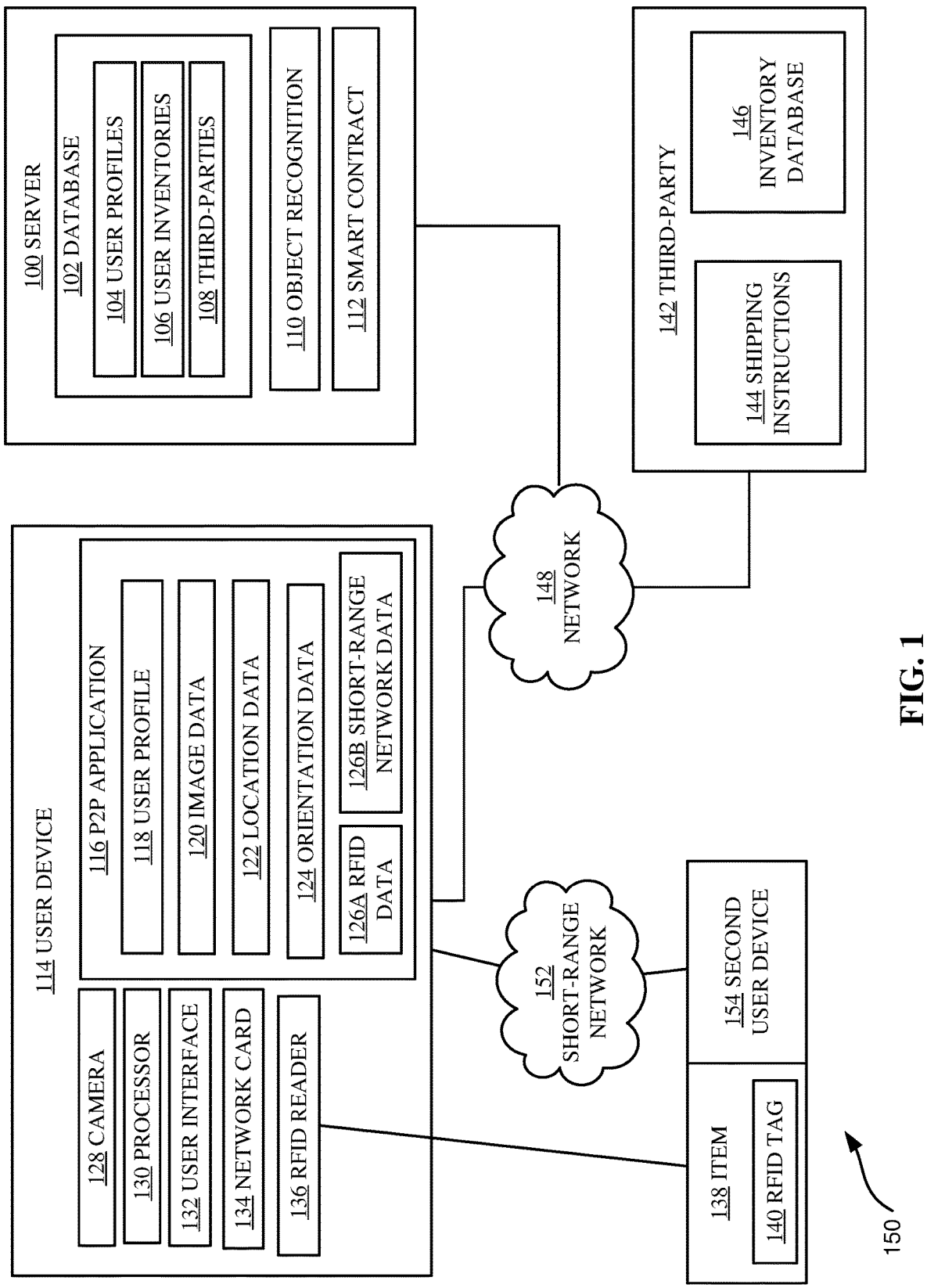
FIG. 1 illustrates an example Internet of Things (IoT) environment for peer-to-peer (P2P) attribution using radio-frequency identification technology and/or short-range wireless network technology, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward to peer-to-peer (P2P) processing, and, more specifically, to providing P2P attribution in an Internet of Things (IoT) environment. While not limited to such applications, embodiments of the present disclosure may be better understood in light of the aforementioned context.

Aspects of the present disclosure provide a technical solution enabling a customer to take a photograph of an item associated with an owner, receive inventory information about the item (e.g., price, availability, etc.) from a server, securely purchase the item via an online retailer, properly attribute the sale to the owner of the item, and become a P2P marketer of the item by associating a customer identifier with the item shipped to the customer. Thus, aspects of the present disclosure provide the technical infrastructure to support a P2P marketing ecosystem. A P2P marketing ecosystem enables retailers to showcase items and facilitate purchases without the capital expenditures of physical stores.

In some embodiments, radio-frequency identification (RFID) tags are utilized in combination with object recognition to improve identification of the product, ensure proper attribution of the sale, and/or enable the customer to become a P2P marketer.

In some embodiments, a short-range wireless network (e.g., a wireless personal area network (WPAN)) is used to improve proper identification of a product using user inventories in combination with object recognition to properly identify a product, ensure proper attribution of a sale, and/or enable the customer to become a P2P marketer.

In some embodiments, both RFID tags and a wireless short-range network are utilized as previously discussed. Using both RFID tags and a wireless short-range network can improve accuracy (e.g., increased certainty), speed (e.g., shorter processing time), and/or reliability (e.g., redundancy) in properly identifying a product and correctly attributing transactions.

As one example, a first user having a P2P application executing on a first user device can take a photograph of a friend, where the friend may be wearing an item of clothing the first user is interested in purchasing. Object recognition can be performed on the photograph to identify the item of clothing. Furthermore, the first user device can be communicatively coupled to a second user device of the friend, where the second user device is also executing the P2P application. The P2P application on the first user device can cross-reference the item of clothing identified by object recognition with an item stored in an inventory of the P2P application executing on the second user device and/or with an RFID tag incorporated into the item of clothing. The P2P application on the first user device can then provide information to a user interface of the first user device indicating a cost, retailer, and/or shipping information associated with the item of clothing. The first user can elect to buy the item of clothing for the cost and from the retailer based on input to the first user device. The P2P application can implement a smart contract between the first user, the friend, and the retailer, where the smart contract automatically decrements an account of the first user by the cost, increments an account of the friend by a commission, increments an account of the retailer by the cost less the commission, and securely records the transaction. The item of clothing can be shipped to the first user, and the P2P application executing on the first user device can add the item of clothing to an inventory of the first user. In some embodiments, prior to shipping the item of clothing to the first user, a RFID tag is embedded in the item of clothing and configured to store an identifier of the item of clothing and/or an identifier of the first user.

Aspects of the present disclosure overcome a variety of technical challenges associated with a P2P marketing ecosystem.

A first technical challenge regards proper identification of items a customer may wish to purchase. Aspects of the present disclosure overcome this challenge in numerous ways. A first technique uses location data, orientation data, image data, and RFID data. The location data and orientation data are used in combination with the RFID data to identify a subset of objects the customer may be viewing. Object recognition is performed on the image data to match products identified in the image data with RFID data of objects in the vicinity of (e.g., surrounding, around, etc.) the customer as determined by the location data and orientation data.

A second technique uses location data, orientation data, image data, and short-range wireless network data. The location data and orientation data are used in combination with the short-range wireless network data to properly identify objects of interest to the customer. Object recognition is used on the image data to match products identified in the image data with a product in a peer's inventory, where the peer is communicatively coupled to the user device via the short-range wireless network (and located in the vicinity of the user as determined by the location data and orientation data).

A third technique uses location data, orientation data, image data, and both RFID data and short-range network data. In such embodiments, a first user profile executing on a first user device can detect a RFID tag, and the information in the RFID tag can be matched to a product in an inventory of a second user profile executing on a second user device, where the second user device is communicatively coupled to the first user device by the short-range network. In such embodiments, the matched product can then be matched to the item in the image data detected by object recognition. Although a single item was previously discussed, aspects of the present disclosure utilizing both RFID technology and short-range network technology can be especially useful in situations where numerous (e.g., tens, hundreds) of RFID tags are detected and numerous (e.g., tens) of peer user devices are within short-range network communication with the first user device. In such embodiments, cross-referencing RFID data with short-range network data and object recognition data can promote accuracy and reliability in properly identifying an object the first user profile is interested in purchasing.

Thus, aspects of the present disclosure exhibit improved accuracy of product identification relative to other methods.

A second technical challenge regards proper attribution. Accurate and reliable attribution improves the P2P marketing ecosystem by ensuring that users are appropriately rewarded for initiating a transaction and automatically added to the P2P marketing ecosystem after purchasing an item. However, proper attribution is challenging due to the difficulty in uniquely associating otherwise identical items to individual owners. Furthermore, proper attribution should be automated rather than manual to provide improved accuracy, processing speed, and usability.

Some aspects of the present disclosure overcome this challenge using RFID tags associating each item to an owner. RFID tags enable automated, reliable, and accurate attribution. As one example, a RFID tag can be embedded in a product such as a television, where the RFID tag uniquely identifies a brand and model of the television. In some embodiments, the RFID tag can also uniquely identify an owner of the television. Other aspects of the present disclosure utilize virtual tagging such that a user device in close proximity to each item stores a virtual tag for each item in a user inventory associated with the user profile. As one example, a scarf can be worn by a user, where the user also carries a cell phone executing a P2P application. The P2P application can store an inventory including a serial number of the scarf.

A third technical challenge regards secure and expedient transaction processing in the P2P marketing ecosystem. Aspects of the present disclosure utilize smart contracts to ensure automated, secure, and expeditious processing of each party's obligation in a multi-party transaction. Smart contracts simplify computational overhead as a result of automated execution, verified completion, and secure recordation of the terms of the smart contract. Smart contracts improve the security, accuracy, and reliability of multi-party transactions.

Thus, the present disclosure exhibits numerous advantages and improvements that include, but are not limited to, accurate product identification (e.g., utilizing object recognition, RFID identification, and/or short-range wireless communication), proper attribution (e.g., utilizing RFID identification and/or short-range wireless communication), and secure transactions (e.g., using automated transaction protocols). The aforementioned advantages are example advantages, and not all advantages are discussed. Furthermore, embodiments of the present disclosure can exist that contain all, some, or none of the aforementioned advantages while remaining within the spirit and scope of the present disclosure.

Referring now to FIG. 1, illustrated is an example IoT environment 150 utilizing RFID technology and short-range network technology, in accordance with embodiments of the present disclosure. IoT environment 150 includes server 100, user device 114, second user device 154, item 138, and third-party 142.

First, a general example in relation to the major components of FIG. 1 may be useful before a detailed discussion of FIG. 1. In some embodiments, a user of user device 114 may see an item 138 they would like to purchase. Item 138 can be one of many items in the vicinity of user device 114, and one or more of the many items can have RFID tags such as RFID tag 140 in item 138. An RFID reader 136 in user device 114 can be intermittently or continuously collecting RFID data 126A from RFID tags such as RFID tag 140 in the vicinity of user device 114. Likewise, user device 114 can interact with a second user device 154 via a short-range network 152 (e.g., Bluetooth). Interactions between user device 114 and other user devices via short-range network 152 can be collected and compiled in short-range network data 126B.

According to various embodiments, both RFID technology and short-range network technology can be used by P2P application 116. However, in some embodiments, only one of RFID technology and short-range network technology can be used by P2P application 116. Improvements in usability, reliability, and accuracy can be realized by having the capability to utilize both RFID technology and short-range network technology, even in situations where only a single technology is actually utilized for a given execution of P2P application 116.

The user can take a photograph of item 138 using camera 128 to generate image data 120. User device 114 can transfer the image data 120 together with location data 122, orientation data 124, RFID data 126A, and/or short-range network data 126B to server 100 via network 148. Server 100 can use object recognition functionality 110 to identify item 138 in the image data 120. The server 100 can use the RFID data 126A and/or short-range network data 126B to identify potential items in the vicinity of user device 114 corresponding to item 138. In some embodiments, server 100 identifies a subset of all items in the vicinity of user device 114 by generating a scan area based on the orientation data 124 and location data 122 to identify only those items indicated in the RFID data 126A and/or short-range network data 126B that also fall within the scan area. Server 100 can then identify item 138 by matching an item identified using object recognition functionality 110 to an item identified using RFID data 126A and/or short-range network data 126B.

Server 100 can send inventory information for item 138 from a third-party 142 to user device 114. Inventory information can include, for example, a cost and an estimated time of arrival. The user may choose to purchase an item similar to item 138 from third-party 142, and the user can confirm such a purchase to server 100 via the P2P application 116. In response to receiving an order confirmation, server 100 can implement a smart contract 112 between a first user profile associated with user device 114, a second user profile associated with item 138, and the third-party 142. The smart contract 112 can automate delivery of the ordered item to the first user profile, pay for the item from the first user profile to the third-party 142, send a commission to the second user profile owning the item 138, and associate the ordered item to the first user profile so that the first user profile can function as a displayer of the item in the P2P marketing ecosystem.

Now proceeding to a more detailed discussion of the individual components illustrated in FIG. 1. Network 148 can be a wired, wireless, cellular, or different network, or combination of networked, capable of communicatively coupling numerous devices.

Server 100 includes database 102 storing user profiles 104, user inventories 106, and third-parties 108. Server 100 can be any device capable of receiving, sending, storing, and processing data and executing computer-readable program instructions. In various embodiments, server 100 can be a single hardware server or a virtual server provisioned to have functionality associated with one or more hardware servers. Database 102 can be a single database or multiple databases according to various embodiments. In embodiments where database 102 includes multiple databases, the multiple databases can be interrelated using one-to-one, many-to-one, one-to-many, and/or many-to-many interrelationships. Database 102 can be encrypted, password-protected, or otherwise secured. Database 102 can include, but is not limited to, relational databases, hierarchical databases, lightweight directory access protocol (LDAP) databases, graph databases, Structured Query Language (SQL) database, NoSQL databases, and other databases. Although a database is previously discussed, any sufficient data storage technique now known or later developed falls within the spirit and scope of the present disclosure.

User profiles 104 can include user identifiers uniquely identifying each user profile (e.g., serial numbers, usernames, email addresses, names, etc.), addresses (e.g., shipping addresses), linked account information (e.g., linked bank accounts), consents and/or authorizations (e.g., an e-signed terms of service agreement related to the P2P application 116), and so on.

User inventories 106 can include a listing of items associated with (e.g., currently owned by, previously purchased by, etc.) each user profile. User inventories 106 store products for which various users can act as P2P marketers. User inventories can include, for each item, an item classification (e.g., shoe, jacket, bag, etc.), an item serial number (e.g., brand, model number, or other identifier), and a third-party seller (e.g., a retailer).

Third-parties 108 can be a listing of retailers, sellers, inventory managers, or other entities capable of selling an item similar to items listed in user inventories 106. Third-parties 108 can be associated with a business name, an inventory manager, and so on.

Server 100 can also include object recognition functionality 110 and smart contract functionality 112. Object recognition functionality 110 can be useful for identifying item 138 from image data 120 using object recognition techniques known in the art such as, but not limited to, edge detection, grayscale matching, gradient matching, invariance, geometric hashing, scale-invariant feature transform (SIF), speed up robust features (SURF), pose clustering, machine learning, photogrammetry, and other object recognition techniques now known or later developed. One example object recognition functionality 110 is Watson®

Visual Recognition (a registered trademark of International Business Machines (IBM) Corporation).

Smart contract functionality 112 includes processor-executable instructions for creating and automatically implementing a multi-party contract. Smart contract functionality 112 can include processor-executable instructions for recording transactions in a distributed, permissioned, decentralized, and secure ledger (e.g., a blockchain). One example smart contract functionality 112 is a blockchain application executed using Hyperledger® Composer (a registered trademark of The Linux Foundation).

User device 114 can include P2P application 116 containing user profile 118, image data 120, location data 122, orientation data 124, RFID data 126A, and short-range network data 126B. User device 114 can be a smart phone, tablet, laptop, desktop, wearable user device, or other user device. User profile 118 includes a user identifier, address, account information, and so on. User profile 118 corresponds to a user profile of user profiles 104 stored by server 100.

Image data 120 comprises data generated by camera 128 and can be in any suitable image format (e.g., .jpeg, .jpg, .tif, .gif, .bmp, and so on). Image data 120 can include metadata including a time a photograph was captured, Global Positioning System (GPS) coordinates (e.g., latitude and longitude) corresponding to the location the photograph was captured, orientation (e.g., yaw, pitch, and roll, collected from a gyroscope (not shown) at the time the photograph was taken, directional bearing collected from a compass (not shown) at the time the photograph was taken, etc.) and other metadata.

Location data 122 can refer to geolocation data that can be collected by any technique known in the art such as satellite geolocation techniques (e.g., GPS), triangulation geolocation techniques (e.g., using data from multiple cellular towers), radiolocation techniques (e.g., time difference of arrival (TDOA) calculations, line of bearing to a transmitter, etc.), Wi-Fi positioning geolocation techniques, and other geolocation techniques. In some embodiments, location data 122 is extracted from GPS coordinates stored in metadata of image data 120.

Orientation data 124 can refer to directionality and can be derived from an absolute compass bearing at the time the image data 120 is taken by the camera 128. Orientation data 124 can be used to associate a directionality to the location data 122. Orientation data 124 can be derived from yaw, pitch, and roll data collected from a gyroscope (not shown) in user device 114 and/or from a compass (not shown) in user device 114. In some embodiments, orientation data 124 is retrieved from metadata stored in image data 120.

RFID data 126A can refer to RFID information collected from active RFID tags and/or passive RFID tags. In some embodiments, RFID data 126A is received from RFID reader 136. In some embodiments, RFID data 126A contains a serial number uniquely identifying a type of product. In some embodiments, RFID data 126A contains a serial number uniquely identifying the product together with a serial number uniquely identifying a user profile of user profiles 104 that owns the product.

Short-range network data 126B corresponds to data collected about other user devices (e.g., second user device 154) connected to user device 114 by short-range network 152. Short-range network 152 can be any WPAN such as, but not limited to, networks using ANT® or ANT-F® (registered trademarks of Garmin Switzerland GmbH) communication protocols, Bluetooth® (a registered trademark of Bluetooth Sig, Inc.) connections (e.g., connection protocols complying with IEEE 802.15.1), cellular radio transmission protocols, connection protocols complying with IEEE 802.15.4 (e.g., International Society of Automation (ISA) 100, Wireless Highway Addressable Remote Transducer (HART), ZigBee, 6LoPAN, etc.), infrared communication protocols, near-field communication (NFC) protocols, RFID, Ultra-Wideband (UWB), and/or other WPAN technology. In some embodiments, short-range network 152 communicatively couples user device 114 to other user devices within a given radius of user device 114, where the radius can be less than 100 feet, less than 50 feet, less than 30 feet, less than 10 feet, or a different radius.

Short-range network data 126B can include a user profile identifier from user profiles 104 associated with a P2P application 116 operating on the other user devices (e.g., second user device 154). The server 100 can use the identified user profile in short-range network data 126B to gather corresponding user inventories 106 for the identified user profiles. The gathered corresponding user inventories 106 can be cross-referenced with a classified item from object recognition functionality 110 performed on image data 120 to identify the item 138.

Camera 128 can refer to any camera known in the art and capable of generating an image. Processor 130 can refer to any processor known in the art and capable of executing P2P application 116 on user device 114. User interface 132 is configured to present information to a user of user device 114 and receive input from the user of user device 114. Network card 134 is configured to enable communication with server 100 via network 148 (e.g., Wi-Fi) and enable communication with a second user device 154 via a short-range network 152 (e.g., Bluetooth®). Although a single network card 134 is illustrated, some embodiments can include multiple discrete network cards where one network card provides connectivity to network 148 and another network card provides connectivity to short-range network 152. RFID reader 136 can be an active or passive RFID reader for collecting RFID data 126.

Item 138 can be any physical item that may be sold (e.g., merchandise such as clothing, apparel, electronics, food/drink, and other merchandise). Item 138 can have RFID tag 140 incorporated therewith. RFID tag 140 can be an active or passive RFID tag and can store data including at least a serial number identifying item 138. In some embodiments, RFID tag 140 also includes data identifying a user profile from user profiles 104 stored in server 100 that indicates an owner of item 138. In some embodiments, RFID tag 140 also stores traceability data and/or quality data for item 138 such as, but not limited to, batch numbers of materials used in the manufacture of item 138, a date of manufacture, a location of manufacture, and so on.

Third-party 142 can be a third-party from third-parties 108 stored in database 102. Third-party 142 can store an inventory database 146 indicating a status of numerous items such as item 138. Third-party 142 can also include shipping instructions 144 for transferring an item from inventory database 146 to a user of user device 114. Shipping instructions 144 can include instructions for generating a shipping label, estimating a time of delivery, monitoring a delivery status, sending notification of successful delivery, and so on. In some embodiments, shipping instructions 144 include instructions for programming (e.g., creating and storing digital logic) a RFID tag embedded in a product to be shipped with data identifying a user profile that purchased the product.

FIG. 1 is illustrated for ease of discussion and is not to be taken in a limiting sense. Each embodiment of the present disclosure does not necessarily require each component discussed in FIG. 1. Likewise, embodiments of the present disclosure can exist that include more or fewer components than those components illustrated in FIG. 1. Furthermore, the configuration of the components in FIG. 1 is not limiting, and embodiments exist that include similar or dissimilar components arranged in similar or alternative configurations than the configuration shown.

Figure 2:
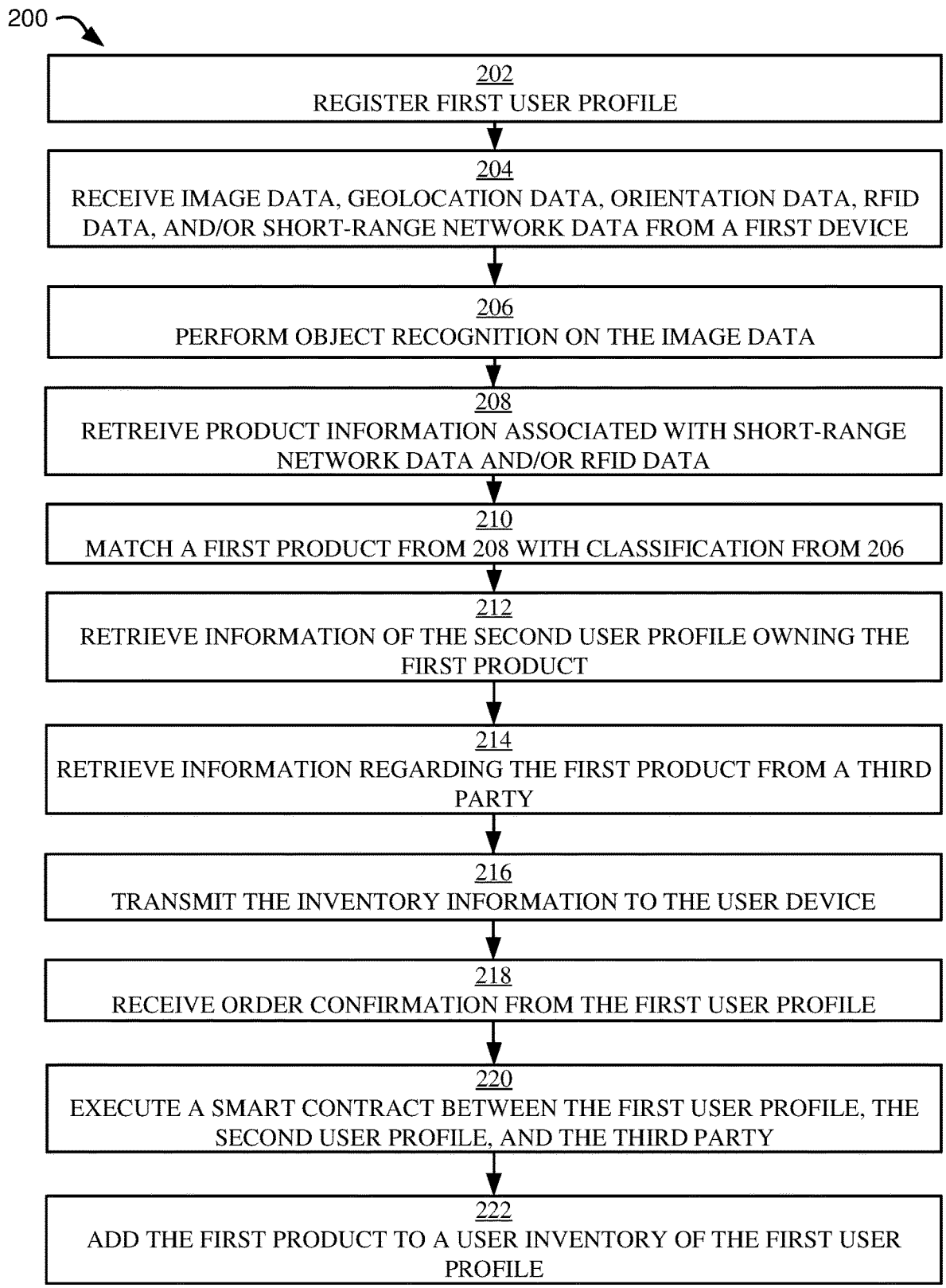
FIG. 2 illustrates a flowchart of an example method for P2P attribution in a multi-party transaction, in accordance with embodiments of the present disclosure.

Referring now to FIG. 2, illustrated is a flowchart of an example method 200 for performing P2P attribution in an IoT environment, in accordance with embodiments of the present disclosure. The method 200 can be implemented by one or more processors, a server such as server 100 of FIG. 1, or a different configuration of hardware and/or software. For simplicity, the method 200 will be described as being performed by a server.

In operation 202, the server registers a first user profile. Registering a first user profile can include generating a unique identifier (e.g., username, serial number, email address, name, etc.), collecting a shipping address, linking a bank account or other account, and/or generating an inventory associated with the first user profile. In some embodiments, operation 202 further includes installing a P2P application (e.g., P2P application 116 of FIG. 1) on a user device associated with the first user profile (e.g., user device 114 of FIG. 1).

In operation 204, the server receives image data (where the image is of an item), geolocation data, orientation data, RFID data, and/or short-range network data from a first user device associated with the first user profile. In some embodiments, the received data is consistent with image data 120, location data 122, orientation data 124, RFID data 126A, and/or short-range network data 126B of FIG. 1. The image data, geolocation data, orientation data, RFID data, and/or short-range network data can be received via a wireless, wired, cellular, or different type of network. The RFID data can include a plurality of serial numbers corresponding to a plurality of RFID tags in the vicinity of the first user device (e.g., a plurality of RFID tags read by an RFID reader integrated into, or communicatively coupled to, the first user device). The short-range network data can include a plurality of identified user profiles of the P2P application in a vicinity of the first user device (e.g., communicatively coupled to the first user device via the short-range network).

In operation 206, the server performs object recognition on the image data received in operation 204. Performing object recognition can include using techniques previously discussed with respect to object recognition functionality 110 of FIG. 1. Operation 206 can output a classified item. The classified item can have varying degrees of specificity ranging from a general classification (e.g., shoe, jacket, tablet, etc.) to a specific classification (e.g., a specific brand and model of watch, etc.).

In operation 208, the server retrieves product information associated with the RFID data and/or the short-range network data. The server can retrieve information such as an item classification, item serial number, and/or owner of each of the plurality of RFID tags. Alternatively, or in addition, the server can retrieve information such as a user inventory listing all items owned by respective users in communication with the user device via short-range network and according to the short-range network data.

In operation 210, the server matches product information for a product identified in operation 208 to the classified item determined in operation 206.

In operation 212, the server retrieves information associated with a second user profile that is the owner of the first item matched in operation 210.

In operation 214, the server retrieves inventory information regarding an inventoried item similar to the first item from a third-party. Retrieving inventory information can include issuing a query to an inventory database of a third party (e.g., inventory database 146 of FIG. 1). The inventory information can include, but is not limited to, a cost, an estimated time of arrival, and a retailer name. The server can retrieve such information by communicating with a third party (e.g., third-party 142) via a network.

In operation 216, the server transmits the inventory information retrieved in operation 214 to the user device via a network. In some embodiments, the transmitted inventory information can be presented to the user device together with the image data received from the user device, where the image data is annotated with the inventory information in close proximity to the first item.

In operation 218, the server receives an order confirmation from the first user profile of the first user device via the network.

In operation 220, the server executes a smart contract between the first user profile, the second user profile, and the third-party. The smart contract is discussed in more detail hereinafter.

In operation 222, the server adds the inventoried item from the third-party to an item inventory associated with the first user profile and stored in a database of the server (e.g., user inventories 106 of FIG. 1).

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 3:
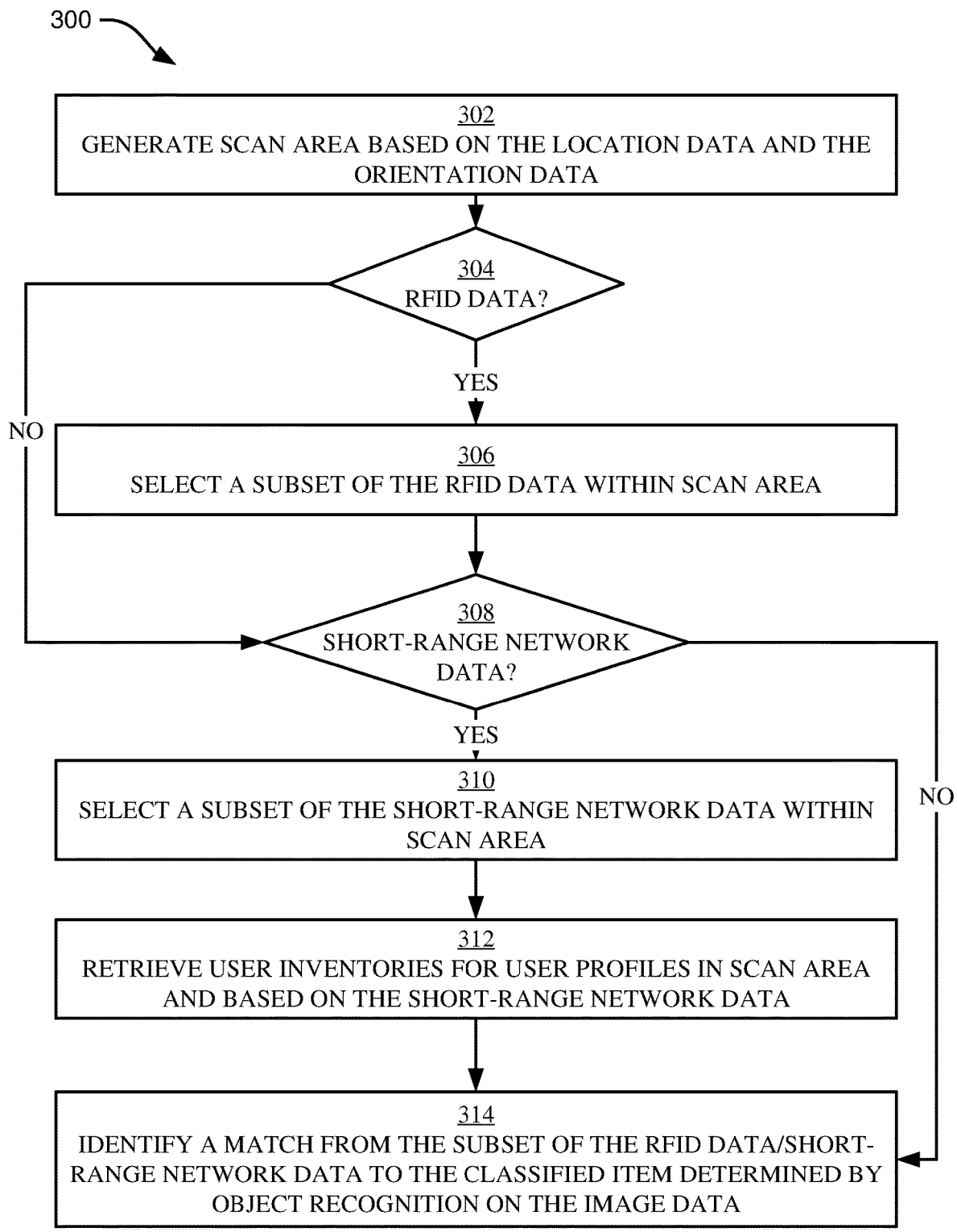
FIG. 3 illustrates a flowchart of an example method for identifying a first product using radio-frequency technology and/or short-range network technology, in accordance with embodiments of the present disclosure.

Referring now to FIG. 3, illustrated is a flowchart of an example method for identifying a product match using RFID technology and/or short-range network technology, in accordance with some embodiments of the present disclosure. In some embodiments, the method 300 is a sub-method of operations 208 and/or 210 of FIG. 2. For simplicity, the method 300 is described as being implemented by a server, however, in other embodiments, alternative configurations of hardware and/or software can implement the method 300.

In operation 302, the server generates a scan area based on the location data and the orientation data received in operation 204 of FIG. 2. The scan area limits the number of possible items by limiting the area of consideration to an area corresponding to a direction the image data received in operation 204. The scan area is discussed in more detail hereinafter with respect to FIGS. 4A and 4B.

In operation 304, the server determines if there is any RFID data (e.g., RFID data 126A of FIG. 1). If there is no RFID data, the method 300 proceeds to operation 308 (discussed hereinafter). If there is RFID data, the method 300 proceeds to operation 306.

In operation 306, the server selects a subset of the RFID data within the scan area defined in operation 302. In some embodiments, the RFID data includes GPS coordinates or other information capable of indicating a location of individual RFID tags. In some embodiments, the location data of the RFID tags may not be embedded within an RFID tag, but is instead generated at the time of reading the RFID tag (e.g., when read by an RFID reader such as RFID reader 136 of FIG. 1) and may use a known location of the RFID reader, an orientation of the RFID reader, and/or a time of delay in communicating between the RFID reader and the RFID tag to approximate a location of the RFID tag.

In operation 308, the server determines if there is short-range network data (e.g., short-range network data 126B of FIG. 1). If there is no short-range network data, the method 300 proceeds to operation 312. In the event there is short-range network data, the method 300 proceeds to operation 310.

In operation 310, the server selects a subset of the short-range network data within the scan area. As previously discussed, the short-range network data can include user profile identifiers and locations of devices associated with each of the user profile identifiers and communicatively coupled to the first user device by the short-range network. Thus, by comparing the locations of the devices associated with each of the user profile identifiers to the scan area, a subset of the user profile identifiers can be selected in operation 310.

In operation 312, the server retrieves user inventories from the subset of user profiles determined in operation 310. Thus, in operation 312, the server generates a list of possible items.

In operation 314, the server identifies a match from the subset of the RFID data and/or short-range network data to the classified item (e.g., as classified by object recognition on the image data in operation 206 of FIG. 2).

In embodiments where only one of RFID technology and short-range network technology are used, then operation 314 identifies the match between either the subset identified in operation 306 or the subset identified in operation 310 with the classified item. In embodiments where both RFID technology and short-range network technology are used, then operation 314 identifies the match between the subset identified in operation 306, together with the subset identified in operation 310, together with the classified item.

Identifying a match can include determining that two serial numbers are identical, determining that a classification of one item matches (e.g., corresponds to, is similar to, etc.) a classification of another item, a combination of the aforementioned techniques, or a different technique.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4A:
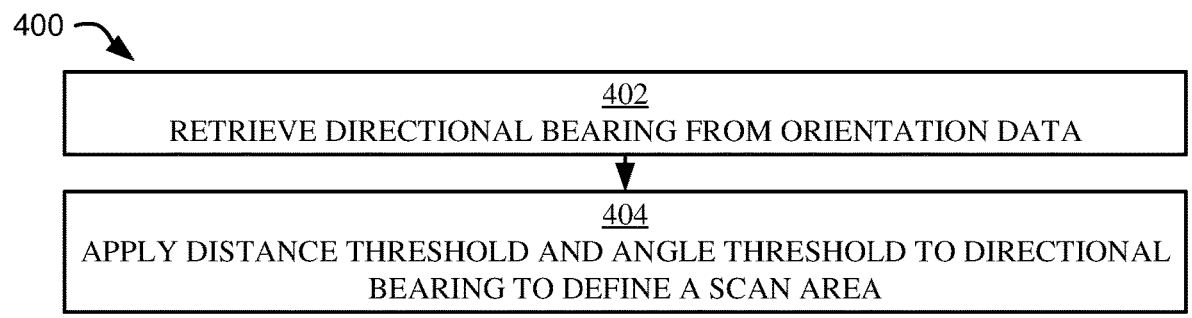
FIG. 4A illustrates a flowchart of an example method for defining a scan area, in accordance with embodiments of the present disclosure.

Referring now to FIG. 4A, illustrated is a flowchart of an example method for generating a scan area, in accordance with embodiments of the present disclosure. In some embodiments, the method 400 is a sub-method of operation 302 of FIG. 3. For simplicity, the method 400 is described as being implemented by a server, however, in other embodiments, alternative configurations of hardware and/or software can implement the method 400.

In operation 402, the server retrieves directional bearing information from the orientation data received in operation 204 of FIG. 2 and the location data from the location data received in operation 204 of FIG. 2.

In operation 404, the server applies a distance threshold and an angle threshold (also referred to as an angular offset) to the directional bearing information and the location data retrieved in operation 402. In so doing, the server generates a scan area centered using the location data and the the directional bearing information, where the scan area comprises an area defined by the angle threshold (e.g., 45°) and the distance threshold (e.g., 10 feet). The scan area can comprise a sector of a circle, where the circle is defined by the radius with the location data as the center of the circle, and where the sector is defined by sight lines extending from the center of the circle and displaced on either side of the directional bearing by the angle threshold.

Using a scan area can expedite processing speed and improve accuracy in identifying a product by limiting a number of possible products in the vicinity of the first user device to a subset of products the first user device was oriented toward when taking the photograph of the product.

Figure 4B:
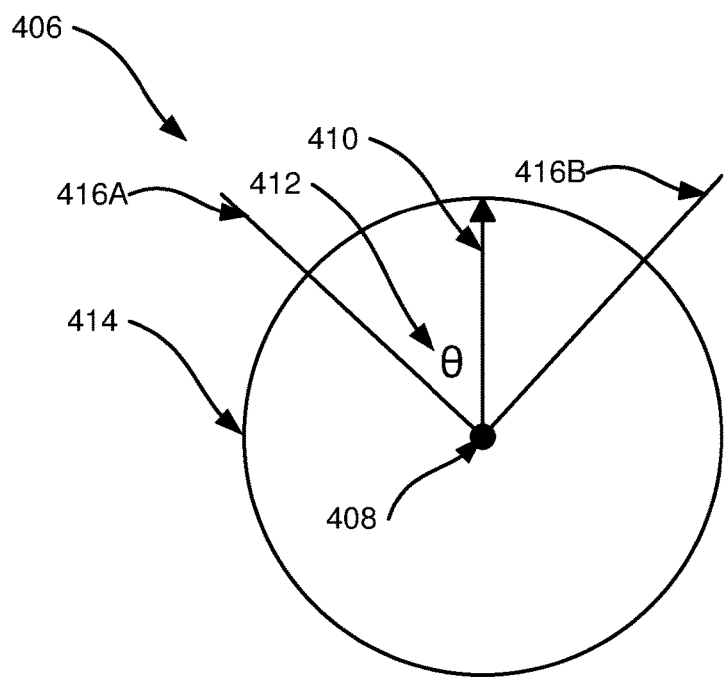
FIG. 4B is a diagrammatic depiction of an example scan area, in accordance with embodiments of the present disclosure.

Referring now to FIG. 4B, illustrated is a diagrammatic depiction of an example scan area 406. The scan area 406 includes a center 408 defined by the location data from the first user device. The scan area 406 also includes a directional bearing 410 extending from the center 408. The scan area 406 also includes a circle 414 centered at the center 408 and having a radius equal to the distance threshold. The scan area 406 also includes sight lines 416A and 416B displaced on either side of directional bearing 410 by an angle threshold 412 (represented as $\theta$ in the drawings) and extending from the center 408. Both the distance threshold (e.g., the radius) and the angle threshold can be user defined. For example, the distance threshold of the circle 414 can be less than, greater than, or equal to, ten feet, 15 feet, 30 feet, 50 feet, or a different radius. The angle threshold 412 can be less than, greater than, or equal to, 30°, 45°, 60°, or a different angle.

As will be appreciated by one skilled in the art, FIGS. 4A and 4B discuss the scan area in two dimensions for ease of explanation and illustration, however, embodiments exist utilizing a three-dimensional scan area including a vertical angle of displacement (e.g., $\varphi$) extending from the center 408 and displaced from the directional bearing 410 in the z-dimension (e.g., into/out of page) to define a conical sector as the scan area rather than a sector of a circle.

Figure 5:
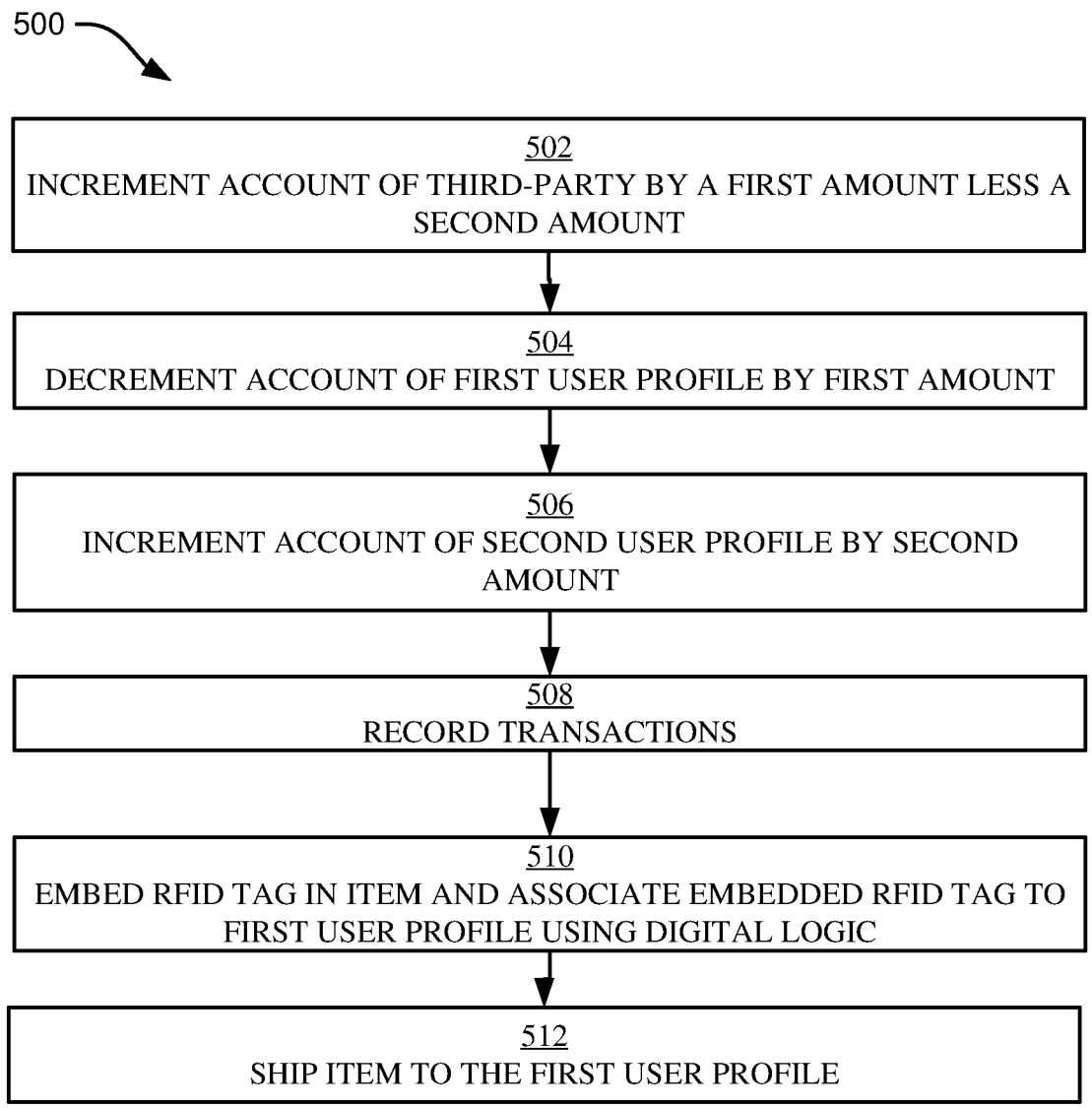
FIG. 5 illustrates a flowchart of an example method for executing a smart contract, in accordance with embodiments of the present disclosure.

Referring now to FIG. 5, illustrated is a flowchart of an example method 500 for executing a smart contract, in accordance with some embodiments of the present disclosure. In some embodiments, the method 500 is a sub-method of operation 220 of FIG. 2. For simplicity, the method 500 is described as being implemented by a server, however, in other embodiments, alternative configurations of hardware and/or software can implement the method 500.

In operation 502, the server increments an account of the third party by a first amount less a second amount, where the second amount is a fraction of the first amount. The second amount can be an amount that functions as a commission for the second user profile for initiating the transaction in the P2P marketing ecosystem.

In operation 504, the server decrements an account of the first user profile by the first amount. The first amount can correspond to an agreed cost between the third-party and the first user profile as retrieved from the third-party in operation 214 and indicated to the first user profile in operation 216 of FIG. 2.

In operation 506, the server increments an account of the second user profile by the second amount.

In operation 508, the server records the transactions from operations 502-506. The transactions can be recorded in a distributed, decentralized, permissioned, and secure ledger, such as a blockchain. In some embodiments utilizing a blockchain, operation 508 includes hashing a value of transactions discussed in operations 502-506 and storing the hash in header information of a current block of the blockchain.

In operation 510, the server can verify that a RFID tag is embedded in the item and associate digital logic in the RFID tag with the first user profile. Operation 510 can further comprise, or alternatively include, adding the item to a user inventory of the first user profile.

In operation 512, the server causes the item to be shipped to the first user profile. In some embodiments, operation 512 causes a shipping form to be generated, printed, and/or affixed to the item. In some embodiments, operation 512 causes automated inventory management technology (e.g., drones, automated inventory machines) to retrieve (e.g., pick) an item from a warehouse and prepare it for shipping by printing and affixing a shipping label to the item.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 6:
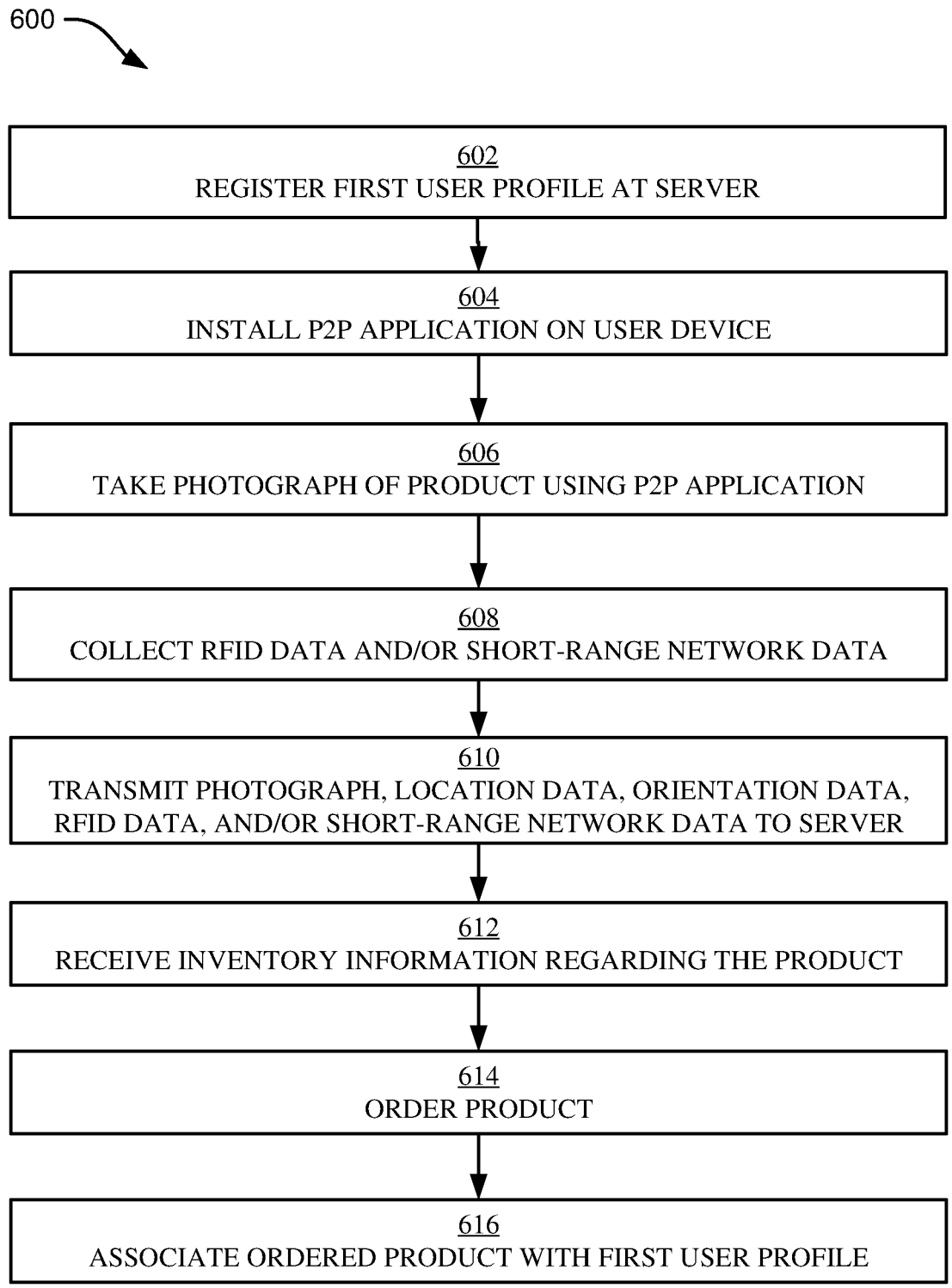
FIG. 6 illustrates a flowchart of an example method for using a P2P application at a user device, in accordance with embodiments of the present disclosure.

Referring now to FIG. 6, illustrated is a flowchart of an example method for using a P2P application at a user device, in accordance with embodiments of the present disclosure. For simplicity, the method 600 is discussed as being implemented by a user device such as user device 114 of FIG. 1. However, in other embodiments, other configurations of hardware and/or software can implement the method 600.

In operation 602, the user device registers a first user profile by communicating with a server via a network. Registering the first user profile can include providing information such as a unique identifier, contact information, shipping address information, bank account information, and/or other information.

In operation 604, the user device installs a P2P application downloaded from the server. The P2P application installed on the user device can be associated with the first user profile.

In operation 606, the user device takes a photograph of a product using a camera communicatively coupled to the user device. The photograph can be taken while executing the P2P application or later uploaded to the P2P application. Operation 606 can also include recording location data and orientation data of the user device at the time the photograph is taken based on readings from a compass, gyroscope, GPS module, and/or different components.

In operation 608, the user device collects RFID data and/or short-range network data. RFID data can be collected from an RFID reader communicatively coupled to the user device. Short-range network data can be collected from other user device communicatively coupled to the user device via a short-range network.

In operation 610, the user device transmits the photograph, location data, orientation data, RFID data, and/or short-range network data to a server (e.g., server 100 of FIG. 1).

In operation 612, the user device receives inventory information regarding the product including at least a cost and an estimated shipping time. In some embodiments, the information is presented on a user interface of the user device including the photograph taken in operation 606, where the photograph is modified to include item descriptions and costs adjacent to one or more items contained in the photograph.

In operation 614, a user of the user device orders the product by agreeing to a contract between the third-party retailer, the first user profile, and a second user profile, where the second user profile is an owner of the item in the photograph.

In operation 616, the user device associates the ordered product with an inventory of the first user profile by adding a product classification, product serial number, and/or product RFID data to the inventory of the first user profile.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 7:
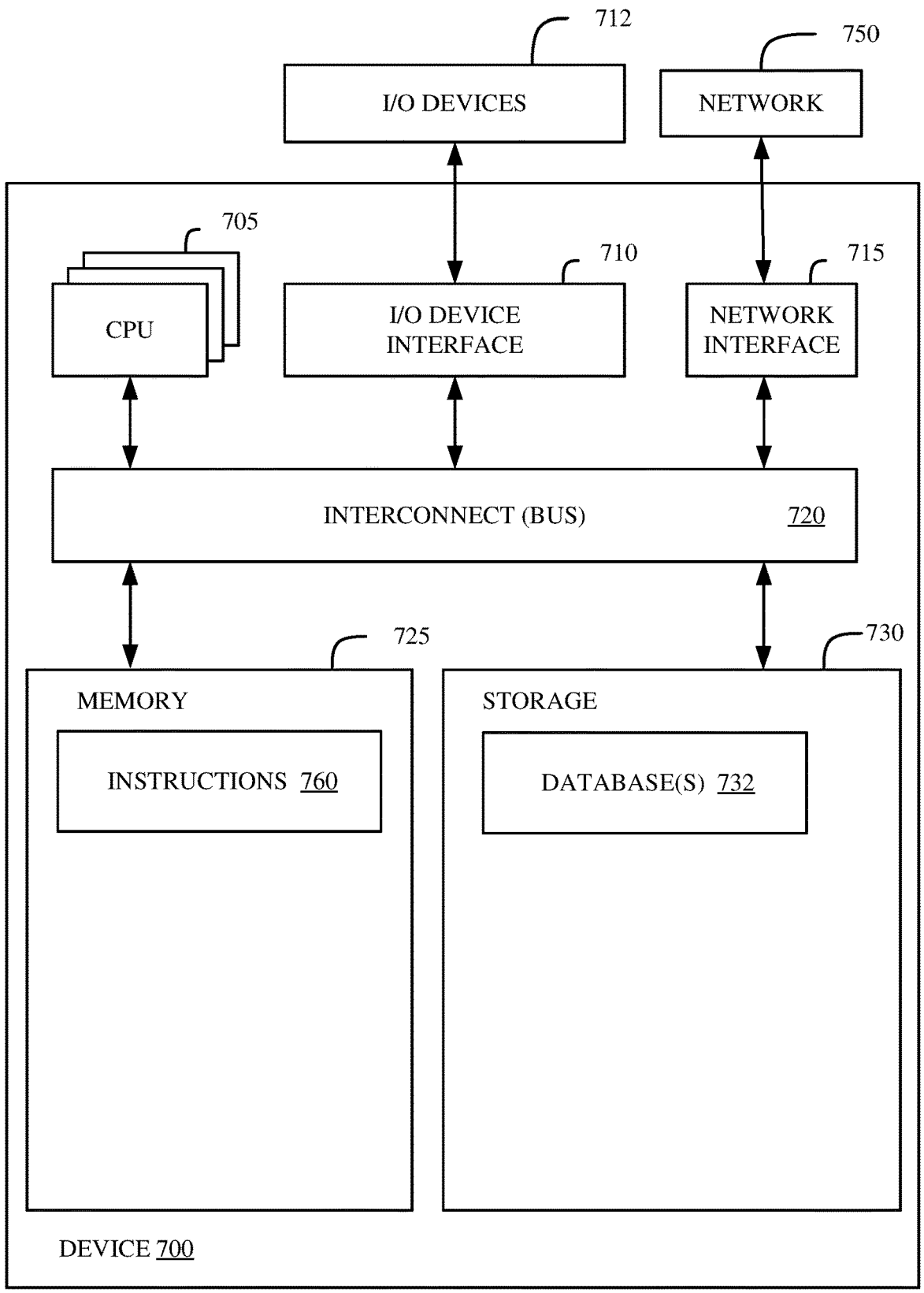
FIG. 7 illustrates a block diagram of an example device, in accordance with embodiments of the present disclosure.

FIG. 7 illustrates a block diagram of an example device 700 in accordance with some embodiments of the present disclosure. In various embodiments, device 700 can perform the methods described in FIGS. 2-6. In some embodiments, device 700 provides instructions for the methods described in FIG. 2-6 to a client machine such that the client machine executes the method, or a portion of the method, based on the instructions provided by the device 700. In some embodiments, device 700 can execute operations in a physically constructed or virtually configured system in accordance with FIG. 1. In various embodiments, device 700 is consistent with server 100 of FIG. 1 or user device 114 of FIG. 1.

The device 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 7D integrated circuits (3DICs) (e.g., 7D wafer-level packaging (3DWLP), 7D interposer based integration, 7D stacked ICs (3D-SICs), monolithic 7D ICs, 7D heterogeneous integration, 7D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, or flash memory devices. In an alternative embodiment, the storage 730 can be replaced by storage area-network (SAN) devices, the cloud, or other devices connected to the device 700 via the I/O device interface 710 or a network 750 via the network interface 715.

In some embodiments, the memory 725 stores instructions 760 and the storage 730 stores database(s) 732. However, in various embodiments, the instructions 760 and database 732 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of, any of the methods of FIG. 2-6 and/or the functionality discussed in FIG. 1. Database(s) 732 can store information related to a P2P application such as, but not limited to, user profiles, user inventories, and third-party information. In some embodiments, database 732 is consistent with database 102 of FIG. 1.

In various embodiments, the I/O devices 712 include an interface capable of presenting information and receiving input. For example, I/O devices 712 can present information to a user interacting with device 700 and receive input from the user.

Device 700 is connected to the network 750 via the network interface 715. Network 750 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
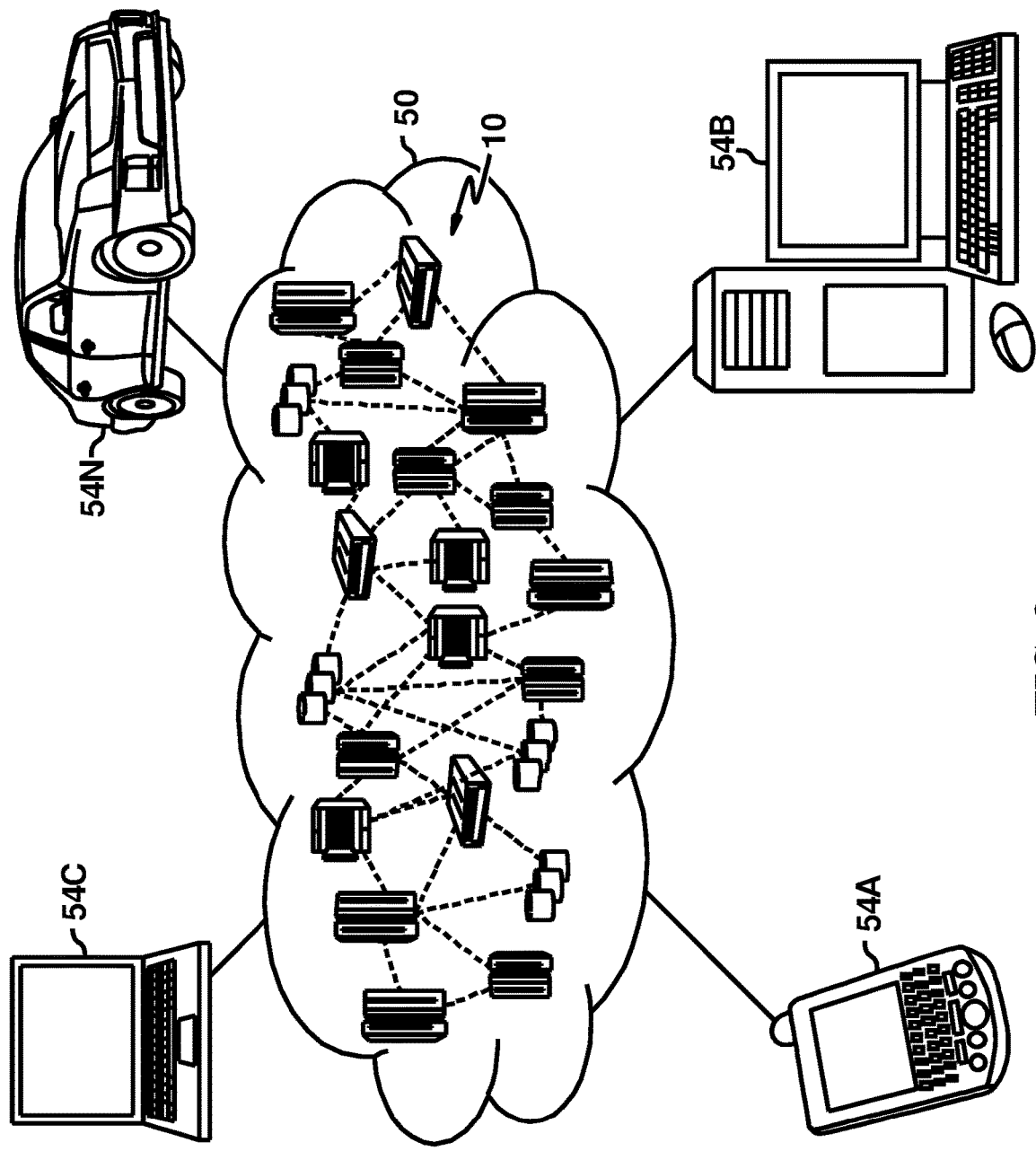
FIG. 8 depicts a cloud computing environment, according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
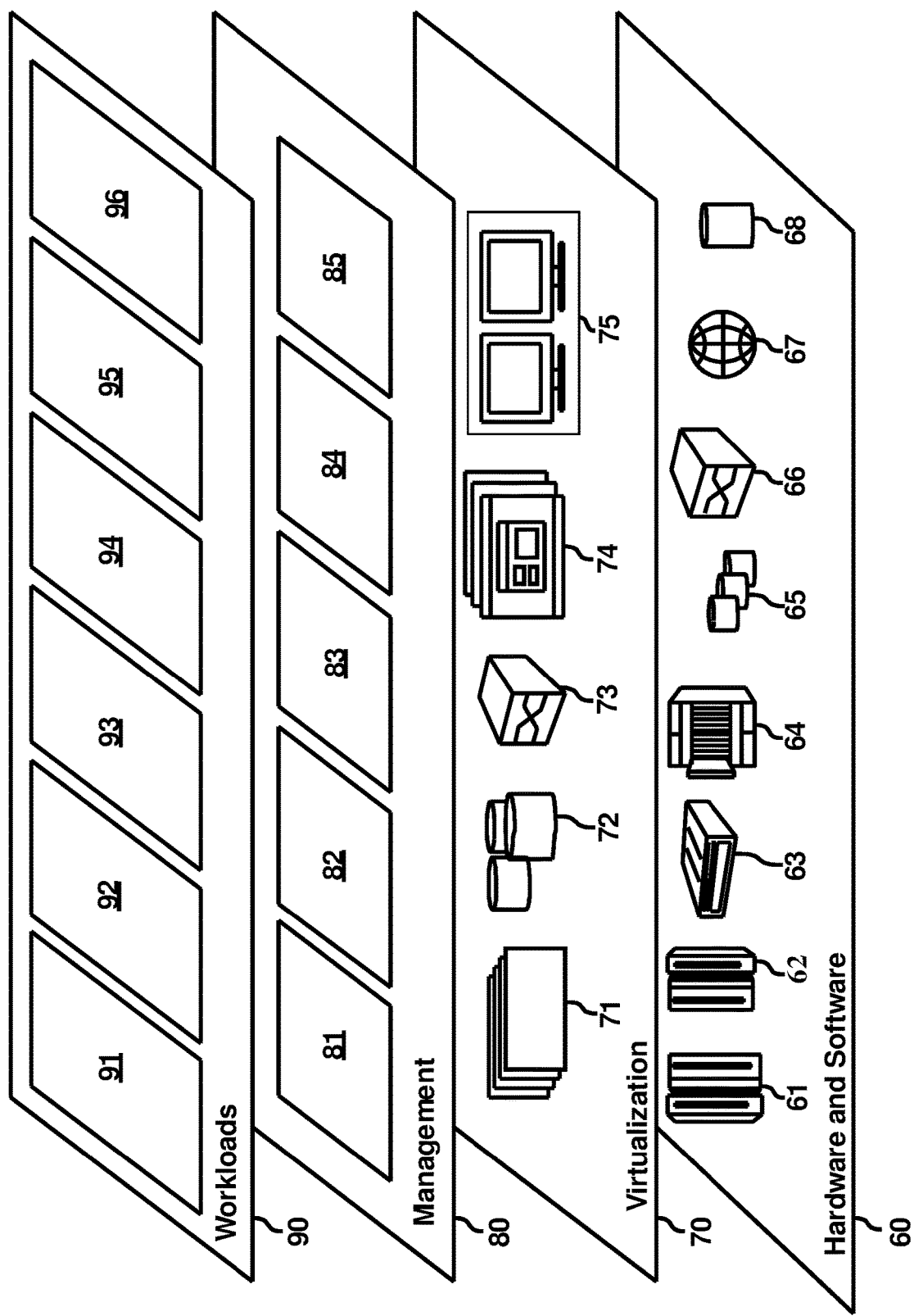
FIG. 9 depicts abstraction model layers, according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and P2P attribution in multiparty transactions 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the method described with respect to FIGS. 2-6, or to implement the functionality discussed in FIG. 1, in whole or in part) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving, at a server and from a first user profile of a peer-to-peer (P2P) application executing on a first user device, an image of an item, a plurality of radio-frequency identifiers, and a plurality of other user profiles respectively executing on a plurality of other user devices communicatively coupled to the first user device by a wireless personal area network (WPAN);
   performing object recognition on the image of the item by the server to generate a classified item;
   retrieving, by the server and from a database, a first product corresponding to one of the plurality of radio-frequency identifiers and that is included in an inventory of a second user profile from the plurality of other user profiles;
   matching, by the server, the first product to the classified item based on the first product having a classification corresponding to the classified item;
   transmitting, by the server, inventory information for the first product from a third-party server to the first user device;
   receiving, at the server and from the first user device, an order confirmation for the first product;
   executing a smart contract between the first user profile, the second user profile, and the third-party, wherein executing the smart contract causes the third-party to ship the first product to a first address of the first user profile; and
   adding, by the server, the first product to a first inventory of the first user profile.

2. The method according to claim 1, wherein receiving the image of the item further includes receiving a geolocation of the first user device and a directional orientation of the first user device, wherein retrieving the first product further comprises:
   generating a scan area around the first user device based on the geolocation and the directional orientation;
   selecting a subset of the plurality of radio-frequency identifiers within the scan area;
   selecting a subset of the plurality of other user profiles within the scan area, wherein the subset of the plurality of other user profiles includes the second user profile; and
   identifying a first radio-frequency identifier of the subset of the plurality of radio-frequency identifiers that is included in the inventory of the second user profile of the subset of the plurality of other user profiles.

3. The method according to claim 2, wherein the scan area comprises a sector of a circle, wherein the circle is centered at the geolocation and has a radius, and wherein the sector is defined by an angular offset to either side of the directional orientation.

4. The method according to claim 3, wherein the radius is less than 30 feet, and wherein the angular offset is less than 45 degrees.

5. The method according to claim 1, further comprising:
   retrieving, by the server, inventory information for the first product from a third-party server by:
      transmitting a query including the first product from the server and to the third-party server; and
      receiving, at the server and from the third-party server, the inventory information, wherein the inventory information includes an amount and an estimated time of arrival.

6. The method according to claim 1, wherein executing the smart contract further comprises:
   incrementing a third account of the third-party by a first amount less a second amount, and wherein the second amount is a fraction of the first amount;
   decrementing a first account of the first user profile by the first amount; and
   incrementing a second account of the second user profile by the second amount.

7. The method according to claim 6, wherein executing the smart contract further comprises:
   embedding a radio-frequency identification tag in the first product and configuring digital logic in the radio-frequency identification tag to identify the first user profile.

8. The method according to claim 1, wherein prior to receiving the image of the item, the method further comprises:
   registering the first user profile on the server and installing the P2P application on the first user device associated with the first user profile, wherein the first user profile is associated with a first user identifier, the first address, a first account, and the first inventory.

9. A system comprising:
   a processor; and
   a computer-readable storage medium communicatively coupled to the processor and storing program instructions which, when executed by the processor, cause the processor to perform a method comprising:
      receiving, at a server and from a first user profile of a peer-to-peer (P2P) application executing on a first user device, an image of an item, a plurality of radio-frequency identifiers, and a plurality of other user profiles respectively executing on a plurality of other user devices communicatively coupled to the first user device by a wireless personal area network (WPAN);
      performing object recognition on the image of the item by the server to generate a classified item;
      retrieving, by the server and from a database, a first product corresponding to one of the plurality of radio-frequency identifiers and that is included in an inventory of a second user profile from the plurality of other user profiles;
      matching, by the server, the first product to the classified item based on the first product having a classification corresponding to the classified item;
      transmitting, by the server, inventory information for the first product from a third-party server to the first user device;
      receiving, at the server and from the first user device, an order confirmation for the first product;
      executing a smart contract between the first user profile, the second user profile, and the third-party, wherein executing the smart contract causes the third-party to ship the first product to a first address of the first user profile; and
      adding, by the server, the first product to a first inventory of the first user profile.

10. The system according to claim 9, wherein receiving the image of the item further includes receiving a geolocation of the first user device and a directional orientation of the first user device, wherein retrieving the first product further comprises:

generating a scan area around the first user device based on the geolocation and the directional orientation;

selecting a subset of the plurality of radio-frequency identifiers within the scan area;

selecting a subset of the plurality of other user profiles within the scan area, wherein the subset of the plurality of other user profiles includes the second user profile; and identifying a first radio-frequency identifier of the subset of the plurality of radio-frequency identifiers that is included in the inventory of the second user profile of the subset of the plurality of other user profiles.

11. The system according to claim 10, wherein the scan area comprises a sector of a circle, wherein the circle is centered at the geolocation and has a radius, and wherein the sector is defined by an angular offset to either side of the directional orientation.

12. The system according to claim 9, wherein executing the smart contract further comprises:

incrementing a third account of the third-party by a first amount less a second amount, and wherein the second amount is a fraction of the first amount;

decrementing a first account of the first user profile by the first amount; and incrementing a second account of the second user profile by the second amount.

13. The system according to claim 12, wherein executing the smart contract further comprises:

embedding a radio-frequency identification tag in the first product and configuring digital logic in the radio-frequency identification tag to identify the first user profile.

14. The system according to claim 9, wherein the program instructions were downloaded over a network from a remote data processing system.

15. The system according to claim 9, wherein the computer-readable storage medium storing the program instructions is a server data processing system, and wherein the program instructions are downloaded over a network to a remote data processing system for use in a remote computer-readable storage medium with the remote data processing system.

16. A computer program product comprising a computer-readable storage medium having program instructions embodied therewith, wherein the computer-readable storage medium is not a transitory signal per se, the program instructions executable by a processor to cause the processor to perform a method comprising:

receiving, at a server and from a first user profile of a peer-to-peer (P2P) application executing on a first user device, an image of an item, a plurality of radio-frequency identifiers, and a plurality of other user profiles respectively executing on a plurality of other user devices communicatively coupled to the first user device by a wireless personal area network (WPAN);

performing object recognition on the image of the item by the server to generate a classified item;

retrieving, by the server and from a database, a first product corresponding to one of the plurality of radio-frequency identifiers and that is included in an inventory of a second user profile from the plurality of other user profiles;

matching, by the server, the first product to the classified item based on the first product having a classification corresponding to the classified item;

transmitting, by the server, inventory information for the first product from a third-party server to the first user device;

receiving, at the server and from the first user device, an order confirmation for the first product;

executing a smart contract between the first user profile, the second user profile, and the third-party, wherein executing the smart contract causes the third-party to ship the first product to a first address of the first user profile; and adding, by the server, the first product to a first inventory of the first user profile.

17. The computer program product according to claim 16, wherein receiving the image of the item further includes receiving a geolocation of the first user device and a directional orientation of the first user device, wherein retrieving the first product further comprises:

generating a scan area around the first user device based on the geolocation and the directional orientation;

selecting a subset of the plurality of radio-frequency identifiers within the scan area;

selecting a subset of the plurality of other user profiles within the scan area, wherein the subset of the plurality of other user profiles includes the second user profile; and identifying a first radio-frequency identifier of the subset of the plurality of radio-frequency identifiers that is included in the inventory of the second user profile of the subset of the plurality of other user profiles.

18. The computer program product according to claim 17, wherein the scan area comprises a sector of a circle, wherein the circle is centered at the geolocation and has a radius, and wherein the sector is defined by an angular offset to either side of the directional orientation.

19. The computer program product according to claim 16, wherein executing the smart contract further comprises:

incrementing a third account of the third-party by a first amount less a second amount, and wherein the second amount is a fraction of the first amount;

decrementing a first account of the first user profile by the first amount;

incrementing a second account of the second user profile by the second amount; and configuring digital logic in a radio-frequency identification tag embedded in the first product to identify the first user profile.

20. The computer program product according to claim 16, wherein the program instructions are provided as a service to one or more servers in a networked environment.

* * * * *